WIGHTMAN & WILLIAMS.
Cultivating Hops.

No. 60,976.　　　　　　　　　　　　Patented Jan. 1, 1867.

Witnesses:　　　　　　　　　　　　Inventor:

United States Patent Office.

ELIAS A. WIGHTMAN AND WILLIAM C. WILLIAMS, OF LIVINGSTONVILLE, NEW YORK.

Letters Patent No. 60,976, dated January 1, 1867.

IMPROVEMENT IN CULTIVATING HOPS.

The Schedule referred to in these Letters Patent and making part of the same.

TO ALL WHOM IT MAY CONCERN:

Be it known that we, ELIAS A. WIGHTMAN and WILLIAM C. WILLIAMS, of Livingstonville, Schoharie county, State of New York, have invented a new and useful Improvement in Cultivating Hops; and we do hereby declare that the following is a full, clear, and exact description thereof, which will enable others skilled in the art to make and use the same, reference being had to the accompanying drawing, forming part of this specification, in which—

Similar letters of reference indicate like parts.

Figure 1:
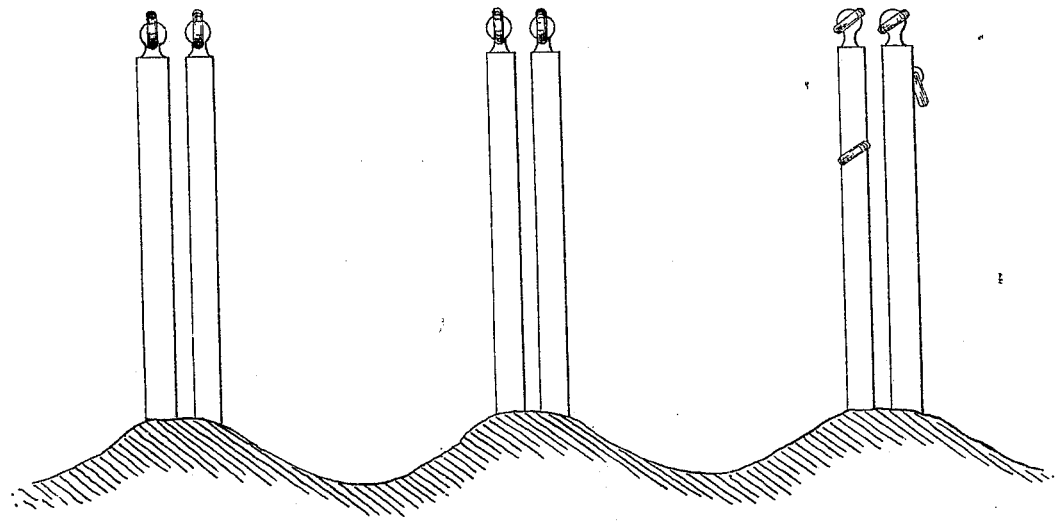
Figure 1 is a side view of a series of hop poles arranged according to our invention.
Figure 2:
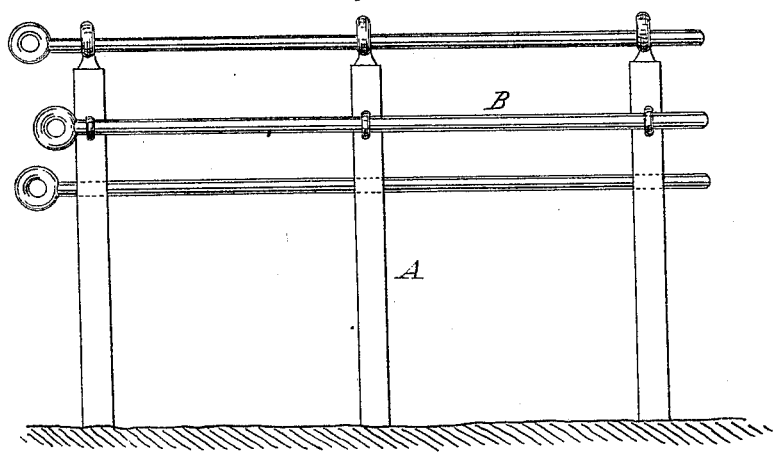
Figure 2 is a top view.

This invention consists in a novel mode of arranging supports for hop vines, whereby the necessity for pulling up the poles, as heretofore has been practised, is done away with. Our plan or method also saves the necessity of cutting the vines in order to gather the hops.

The letter A designates hop poles arranged two at a hill and about eight to ten feet high. On the top or near the top of each pole is placed a rod or wire, B, extending horizontally from one pole to another. These rods may be of a length to reach across the intervals between three hills, or they may be longer, it being desirable, however, that they be not so long as to be heavy and unwieldy. The "hills" or, in other words, the vines, are placed apart the usual distance and in regular and symmetrical order, the poles being also set in regular order. The rods or wires may be suspended from the sides of the poles in staples or hooks, or they may go through holes made in the posts near their upper ends, or an eye-bolt may be screwed or driven into the tops of the poles to receive the rods. The vines are trained to ascend the poles, and having reached their tops they will branch out over the rods or wires, which will support them and enable the vines to form a continuous and level mass of foliage throughout the vineyard. When the hops are to be gathered the rods are withdrawn from the staples or holes or other device which holds them up on the poles, and the vines are suffered to fall to the ground as fast as the hop pickers advance through the vineyards. It is not necessary to pull the poles in order to gather the crop, nor is it necessary to cut the vines when our method is adopted. The poles are left standing until they become decayed or worn out, and by leaving them standing the cultivator can manure the hills in the winter, because the places of the vines are designated by the poles. This method of cultivation saves a great deal of labor in cultivating a hop vineyard and in poling the same, and also in picking the hops. More than one rod or wire may be used with a line of poles if desired. It will be observed that the poles are set two at a hill, and therefore, in case there is only one rod or wire to each line of poles, there will be still a double set of rods to each vine, because the poles are double, and each pole forms one of a separate series or line of poles. The wires can be attached to the poles by tying them with cords whose ends may be carried down to the place of the hill, where they will be always in reach to be operated when the cords are to be unloosed and the wires dropped to the ground with their load of vines and hops.

We claim as new, and desire to secure by Letters Patent—

The sliding rod B arranged with the poles A as shown, adapted to be drawn therefrom when desired, substantially as represented and described.

E. A. WIGHTMAN.
WM. C. WILLIAMS.

Witnesses:
JAMES BURNET,
R. E. GREEN.